United States Patent [19]
Marcq et al.

[11] Patent Number: 5,989,453
[45] Date of Patent: Nov. 23, 1999

[54] PROCESS FOR THE MANUFACTURE OF PIGMENTS, ESPECIALLY FLUORESCENT PIGMENTS

[75] Inventors: Michel Jean Marcq, Saint Martin Longueau, France; Martin Tanner, Tentlingen, Switzerland

[73] Assignees: Société Nouvelle de Chimie Industrielle S.A., Saint-Jeorie-en-Faucigny, France; Ciba Specialty Chemicals Holding, Inc., Basel, Switzerland

[21] Appl. No.: 08/206,160

[22] Filed: Mar. 7, 1994

Related U.S. Application Data

[63] Continuation-in-part of application No. 07/969,618, Oct. 30, 1992, abandoned, and a continuation-in-part of application No. 08/123,037, Sep. 20, 1993, abandoned, which is a continuation of application No. 07/698,776, May 13, 1991, abandoned.

[30] Foreign Application Priority Data

| Nov. 5, 1990 | [FR] | France | 90 05910 |
| Nov. 11, 1991 | [FR] | France | 91 402945 |
| May 10, 1992 | [FR] | France | 92 810747 |

[51] Int. Cl.$^6$ .............. C09K 11/02; C08J 5/45; C08K 5/00
[52] U.S. Cl. ............. 252/301.35; 524/92; 524/104; 524/600; 524/601; 524/700; 524/718; 524/720; 523/456; 523/508
[58] Field of Search ............ 252/301.31, 301.35; 523/456, 508; 524/92, 104, 600, 601, 700, 718, 720

[56] References Cited

U.S. PATENT DOCUMENTS

| 2,809,954 | 10/1957 | Kazenas | 260/45.2 |
| 2,895,917 | 7/1959 | Gaunt | 252/301.2 |
| 3,412,034 | 11/1968 | McIntosh et al. | 252/301.2 R |
| 3,620,993 | 11/1971 | Takano et al. | 260/37 N |
| 3,642,650 | 2/1972 | McIntosh | 252/301.2 R |
| 3,812,051 | 5/1974 | Merkle et al. | 252/301.2 R |
| 3,838,063 | 9/1974 | Foss | 252/301.2 |
| 3,915,884 | 10/1975 | Kazenas | 252/301.2 |
| 3,939,093 | 2/1976 | Papenfuhs et al. | 252/301.2 R |
| 3,972,849 | 8/1976 | Bruenemann et al. | 260/37 P |
| 4,415,685 | 11/1983 | Iqbal et al. | 524/92 |
| 4,579,949 | 4/1986 | Rochat et al. | 546/167 |
| 4,585,878 | 4/1986 | Jost et al. | 548/453 |
| 4,659,775 | 4/1987 | Pfenninger et al. | 524/92 |
| 4,810,802 | 3/1989 | Wallquist et al. | 548/453 |
| 4,975,220 | 12/1990 | Streitel et al. | 252/301.3 S |
| 4,996,789 | 3/1991 | Berbner et al. | 528/230 |
| 5,094,777 | 3/1992 | Di Pietro | 252/301.3 S |

FOREIGN PATENT DOCUMENTS

| 0 355 760 | 2/1990 | European Pat. Off. . |
| 0 422 474 | 4/1991 | European Pat. Off. . |
| 0 427 535 | 5/1991 | European Pat. Off. . |
| 0 456 610 | 11/1991 | European Pat. Off. . |
| 0 489 482 | 6/1992 | European Pat. Off. . |
| 961 575 | 4/1957 | Germany . |
| 3 703 495 | 8/1988 | Germany . |
| 733 856 | 7/1955 | United Kingdom . |
| 748 484 | 5/1956 | United Kingdom . |
| 786 678 | 11/1957 | United Kingdom . |
| 869 801 | 6/1961 | United Kingdom . |
| 980 583 | 1/1965 | United Kingdom . |
| 1 304 871 | 1/1973 | United Kingdom . |
| 1 341 602 | 12/1973 | United Kingdom . |
| 1 383 051 | 2/1975 | United Kingdom . |
| 9 013 609 | 11/1990 | WIPO . |

OTHER PUBLICATIONS

Encyclopedia of Polymer Science and Technology, 1988, Mark H. F. et al Eds. vol. 14, pp. 169–189.
"Kirk–Othmer Encyclopedia of Chemical Technology", 2nd Ed, pp. 13–15, Wiley Interscience, 1982.
Encyclopedia of Polymer Science and Engineering, vol. 14, pp. 174–175 (Wiley) (1988).
"Perry's Chemical Engineers' Handbook", 6th Edition, pp. 4–25, Green et al., McGraw–Hill, 1984.
Chem. Brit. 335–40 (1977).
Chem. Abst. 115:116465c.
Chem. Abstr. 110:59524s.
Encyclopedia of Polymer Science and Engineering, vol. 3, p. 747 (Wiley, 1988).

*Primary Examiner*—Ponnathapura Achutamurthy
*Assistant Examiner*—P. Ponnaluri
*Attorney, Agent, or Firm*—Wenderoth, Lind & Ponack, L.L.P.

[57] ABSTRACT

A process for the manufacture of pigments comprising a colored composition incorporated in a polycondensation resin, wherein the reactants for the formation of the polycondensation resin and the colored composition are introduced continuously into an extruder, preferably at a temperature of between 100° C. and 280° C., the mixture is caused to travel forward in the extruder, at the end of reaction the mixture is withdrawn continuously from the extruder, and is deposited continuously onto a conveyor belt, broken up into thermoset flakes, and cooled, the conveyor belt having means for cooling and means for detaching the flakes from the belt. The process is particularly suitable for the preparation of fluorescence pigments. Also disclosed are compositions comprising diketo-pyrrolo-pyrrole colorants and certain polyester or polyamide resins as well as a process for the preparation of the compositions.

22 Claims, 3 Drawing Sheets

Fig. 1

Fig. 2 FLUORESCENT PIGMENT, NONCONTINUOUS PROCESS
PRIOR ART

Fig. 3 FLUORESCENT PIGMENT, CONTINUOUS PROCESS ns 5,989,453

PROCESS FOR THE MANUFACTURE OF PIGMENTS, ESPECIALLY FLUORESCENT PIGMENTS

This is a continuation-in-part of now abandoned application Ser. No. 07/969,618 filed Oct. 30, 1992 and of now abandoned application Ser. No. 08/123,037 filed Sep. 20, 1993, which is a continuation of application Ser. No. 07/698,776 filed May 13, 1991, now abandoned.

The present invention relates to a process for the manufacture of pigments, especially a process for the manufacture of fluorescent pigments, and to certain pigments prepared.

BACKGROUND OF THE INVENTION

It is known that when colored substances are subjected to polychromatic radiation such as, for example, daylight, they have the property of reflecting, transmitting or scattering only certain wavelengths and of absorbing the remainder of the luminous energy, which is dissipated by nonradiative processes. So-called daylight-fluorescent substances have the additional property of converting a proportion of the radiation absorbed at the blue end of the visible spectrum and in the near UV into light which is reemitted at longer wavelengths, also situated in the visible spectrum and equal to those of the light which these substances do not absorb. Through this process, they are capable of producing in the observer's eye an impression of color and of brightness which is up to four times greater than that of ordinary colored substances of the same color. It is also known that the intensity of the emitted fluorescent light is extremely sensitive to so-called fluorescence extinction phenomena and that it is a function especially of the concentration of the fluorescent substance itself (autoextinction phenomenon) and of the possible presence of other substances known as fluorescence inhibitors (which act, for example, by reabsorbing the emitted light or by nonradiative quantum deexcitation processes).

In most applications of colorants (for example paper coating, textile printing, plastic coatings) the colorant molecules must be prevented from migrating, diffusing or redissolving in a solvent. In the case of fluorescent colorants, furthermore, the fluorescence intensity is at a maximum (low autoextinction) in a precise concentration range and, if the other causes of extinction of fluorescence are to be limited, the colorant matter must be protected in an inert but transparent optical medium. A rigid polymer matrix in which the colorant molecule is soluble (solid solution) or dispersible meets these requirements of isolation, confinement and immobilisation. These colored polymers are employed in most cases in the form of finely ground particles, generally referred to as pigments.

The polymers employed for manufacturing fluorescent pigments belong to the classes of thermoplastic and thermosetting resins. Among those most commonly employed are aminoplastic resins resulting from the polycondensation of triazines, amines and formaldehyde. Other polymers, such as polyesters, polyamides and polyurethanes and polyvinyl chlorides can also form the carrier for colorant molecules. Depending on the degree of crosslinking obtained during the polymerisation, these resins are either thermoset or thermoplastic. Thermoset resins are employed in cases where good resistance to solvents and to plasticisers is required (absence of swelling and of colorant diffusion) and when softening under the effect of heat could create problems.

In known processes for the manufacture of these thermoset resins the above mixture is polycondensed in bulk, in noncontinuous batches. Such processes are described e.g. in U.S. Pat. No. 3,939,093, in GB 1,341,602 or in U.S. Pat. No. 3,812,051. On the average the reaction takes 2 hours, per batch, in the reactor. After complete polymerisation a hard, tough solid is obtained, whose texture often resembles that of horn. This solid must be taken out of the polymerisation reactor as a block. This can prove difficult and it is often preferred to complete the reaction by casting the reacting mass, which is still pasty, into troughs and finishing the polymerisation in an oven. The blocks are then crushed and then micronised. The micronisation of this solid presents some difficulties: it requires a pregrinding before a fine microniser is fed, it being necessary for the two items of equipment to be cleaned after each batch. Such conventional processes for the manufacture are also described in Chem. Brit., 335 (1977). The U.S. Pat. No. 3,972,849 proposes the use of known grinding equipment, such as a ball mill, as the reaction vessel in an attempt to avoid the dissadvantages of the conventional manufacturing process.

The inconvenience of the conventional manufacturing processes and the disadvantages of the pigment particles obtained by these processes have led some manufactures, on the other hand, to prefer the manufacture and the use of pigments based on thermoplastic resins each time that a high solvent and temperature resistance is not essential. U.S. Pat. No. 2,809,954, GB 869,801 and GB 980,583 describe the synthesis of pigments based on thermoplastic resins. These fusible, and hence heat-sensitive, resins do not lend themselves well to simple micronising by milling and hence to the manufacture of pigments of a fine and well-determined particle size. These resins generally require an additional stage of manufacture (dispersion, phase separation) to obtain pigment particles of well-determined particle size, which is described, for example, in U.S. Pat. Nos. 3,642,650 and 3,412,034.

The disadvantages of the two types of processes described above are avoided in the manufacture of amide (urea, melamine, and the like)/formaldehyde condensates of low molecular weight or of polyester alkyd resins, wherein to each type of said resins the colorant is attached by affinity. Such processes are described for example in GB 748,848, GB 786,678 or in GB 733,856. However, the applications of such pigments are in practice limited to inks and paints, because the colorant molecules are bound to the condensates only by affinity.

DESCRIPTION OF THE INVENTION

The objective of the present invention is to manufacture pigments comprising a colored composition incorporated in a resin which isolates, confines and immobilises the colored composition, which pigments withstand the action of heat or of solvents, while avoiding the disadvantages of the processes of the prior art and especially the crushing and the difficulties of micronisation.

This objective is attained by a process for the manufacture of pigments, comprising a colored composition incorporated in a polycondensation resin by continuous bulk polycondensation of the reaction mixture, wherein the reactants for the formation of said polycondensation resin and the colored composition are introduced continuously into an extruder, preferably at a temperature of between 100° C. and 280° C., the mixture is caused to travel forward in the extruder, at the end of reaction the mixture is withdrawn continuously from the extruder, and is deposited continuously onto a conveyor belt, broken up into thermoset flakes, and cooled, said conveyor belt having means for cooling and means for detaching the said flakes from the said belt.

Particularly suitable polycondensation resins to be used according to the instant invention are products which are inelastic, non-fiber-forming and brittle and which consequently may easily be converted into particulate form. The resins should moreover have a relatively high softening point, preferably of more than about 100° C., because otherwise at the temperatures which arise during milling the particles of resin may agglomerate and stick together. The resins should also have little or no solubility in the solvents conventionally used in processing, such as e.g. painters' naphtha, toluene and xylenes and also should not swell in these solvents. Furthermore, the resins should exhibit good transparency and adequate fastness to light. Resins meeting these requirements are generally known, and some of them have already been used for the preparation of daylight fluorescent pigments.

Suitable polycondensation resins are for example those, wherein the reactants for the formation of said polycondensation resins are

(a) at least one component A chosen from aromatic sulfonamides containing 2 hydrogens bonded to the nitrogen of the sulfonamide group, (b) at least one component B chosen from substances containing 2 or more $NH_2$ groups, each of the said $NH_2$ groups being bonded to a carbon, the said carbon being bonded by a double bond to an =O, =S or =N, and (c) at least one aldehyde component C.

A continuous process for the production of aqueous melamine-formaldehyde-precondensate solutions is described in the EP-A 355,760. This publication, however, neither discloses a continuous bulk polycondensation, nor the use of component A or of colorants as described in the instant application.

Among the substances capable of forming the component A according to the present invention, there will be mentioned especially benzenesulfonamide and benzenesulfonamide derivatives of general formula:

where the groups R are hydrogen or alkyl groups. A particularly preferred substance A is para-toluenesulfonamide. ortho-toluenesulfonamide, or mixtures of aromatic sulfonamides, such as mixtures of ortho- and para-toluenesulfonamide (e.g. a 50:50 mixture of these components), can also be employed and are available on the market. $C_1$–$C_4$alkyl-benzenesulfonamides, e.g. are also available commercially.

Among the substances which can be employed as component B according to the present invention there will be mentioned especially urea ($NH_2CONH_2$), thiourea ($NH_2CSNH_2$), guanidine ($NH_2)_2CNH$, carbarnylurea ($C_2H_5N_3O_2$), succinamide ($C_4H_8N_2O_2$), among the noncyclic compounds; among cyclic compounds and more particularly among nitrogenous heterocyclic rings there will be mentioned the molecules containing a plurality of $NH_2$ groups, each of these groups being bonded to a carbon of a heterocyclic ring, the said carbon being linked by a double bond to a nitrogen of the heterocyclic ring; these heterocyclic rings include the triazole, diazine, triazine and pyrimidine nuclei; there will be mentioned in particular the guanamine derivatives of general formula:

where R' is hydrogen, an aliphatic radical, an aromatic radical, a saturated or unsaturated cycloaliphatic or alkoxyaryloxy radical. Benzoguanamine may be mentioned among the preferred compounds B.

A compound B which is particularly preferred when it is intended to obtain a thermoset resin is melamine (where R' is $NH_2$). Diguanamines and triguanamines (whose synthesis from the corresponding nitrites and from dicyanodiamide is known, furthermore), or mixtures of the above substances can also be employed as component B according to the present invention, as well as the particular triazine compounds described in the U.S. Pat. No. 3,838,063. A certain amount of the component B according to the invention may be replaced by an isocyanuric ring containing compound, such as isocyanuric acid or its alkyl or aryl esters, respectively; pigment compositions comprising such resins are disclosed in U.S. Pat. No. 3,620,993.

The aldehyde or the mixture of aldehydes forming the component C according to the present invention are formaldehyde, acetaldehyde, propionaldehyde (higher aldehydes can be employed but do not offer any particular advantage within the meaning of the present invention). A particularly preferred compound is paraformaldehyde $(CH_2O)_n$, because of its ease of use.

In the process according to the present invention the melamine concentration, which is preferably between approximately 13% and 40% by weight, of the weight of sulfonamide component A in the reaction mixture, can be taken to values which are markedly higher than those employed in the processes for the manufacture of thermoplastic resins. The concentration of component C in the mixture is preferably between 27% and 40% by weight of the sulfonamide.

A harder and more brittle material is thus obtained, which lends itself better to micronisation and which withstands better the action of heat and of solvents. In the case where the amine chosen as component B is melamine, a decrease in the cost of manufacture is also obtained when the proportion of B is increased, given the low cost of this product. The decrease in the cost of manufacture of the pigments according to the present invention also results generally from the replacement of processes using noncontinuous batches by a continuous reaction process. Surprisingly, it is therefore possible use this process according to the invention to obtain a thermoset resin.

Figure 2:
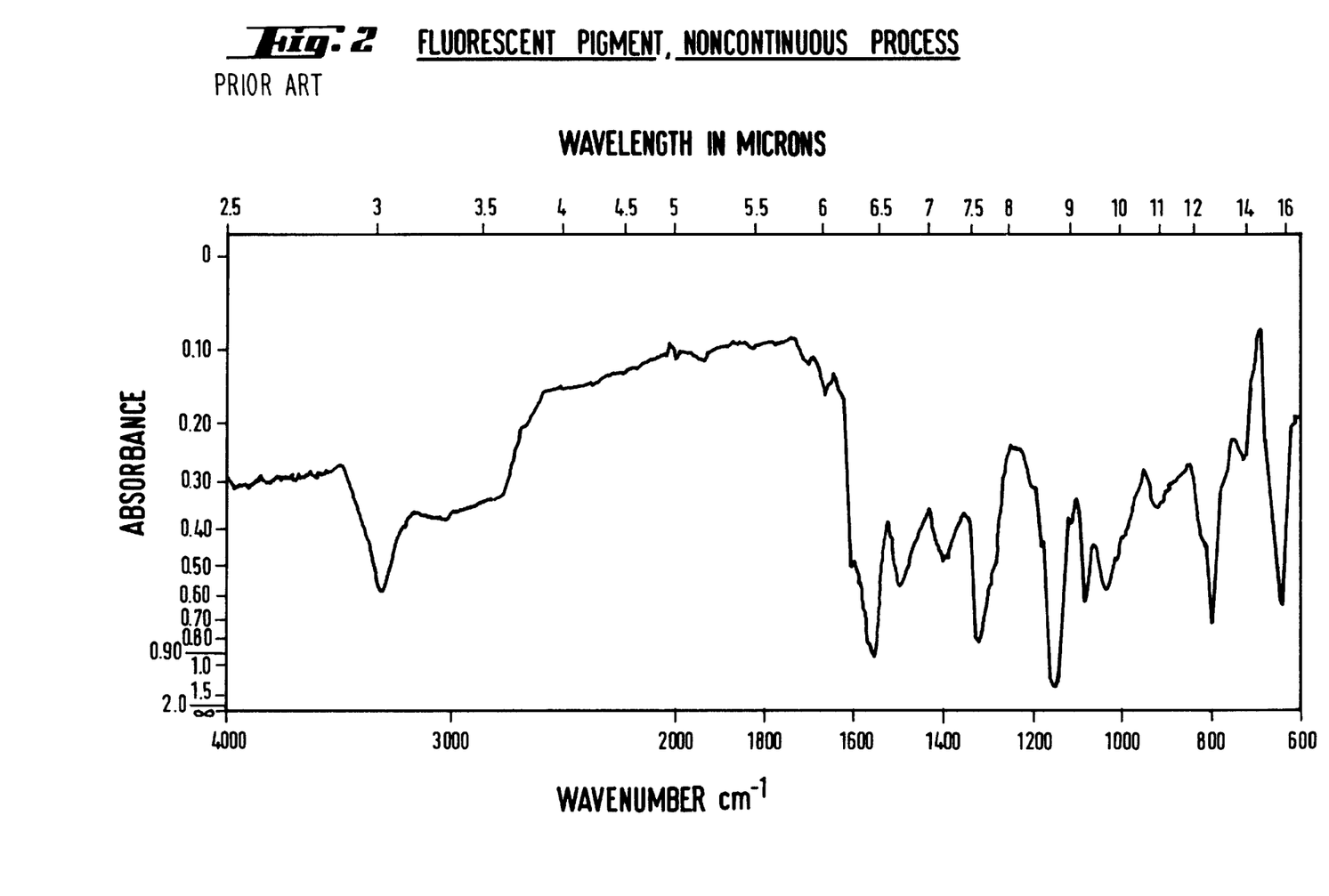
FIG. 2 is an IR spectrometry analysis of a crosslinked resin obtained by noncontinuous polycondensation according to the prior art.
Figure 3:
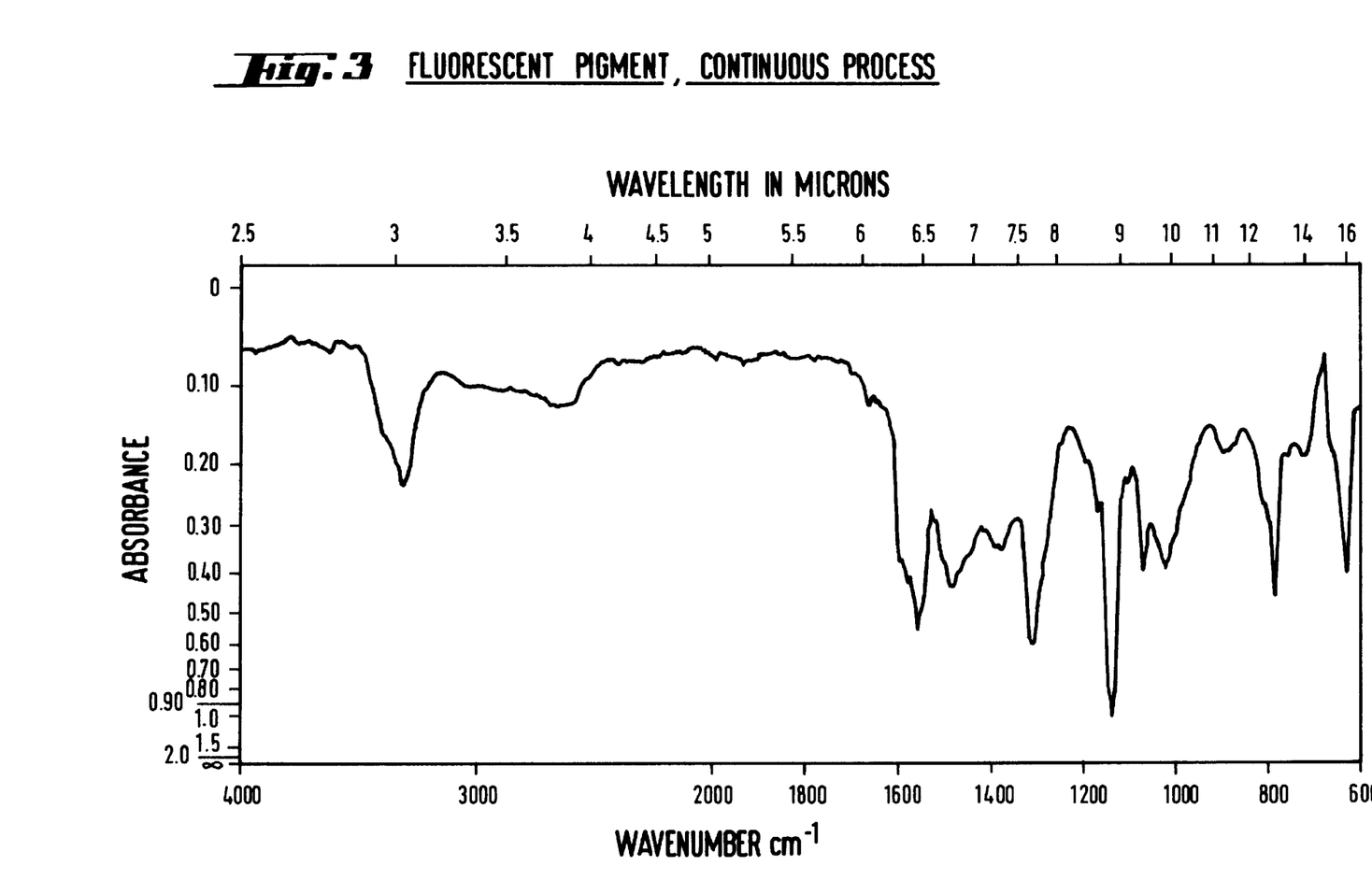
FIG. 3 is an IR spectrometry analysis of a crosslinked resin obtained according to the present invention.

IR spectrometry analysis of samples of crosslinked resin obtained according to the present invention (FIG. 3), when compared with a resin of the same initial composition, obtained by noncontinuous polycondensation according to the prior art (FIG. 2), shows differences in the absorption bands which are characteristic of these crosslinked structures (see FIGS. 2 and 3, in particular the 2500–3400 cm$^{-1}$ region), and hence differences in the polymeric structures.

Further examples of suitable polycondensation resins are i.a. polyamide resins, polyester resins, polycarbonates or polyurethanes. Other suitable resins are polyester/polyamide resins prepared by the reaction of aminoalcohols or aminophenols with polycarbocylic acids, such as the resins described in U.S. Pat. No. 4,975,220.

Particularly suitable polycondensation resins are polyester resins and especially polyamide resins.

Among the preferred resins are crosslinked polyester resins from aromatic polycarboxylic acids or their anhydrides, particularly aromatic dicarboxylic and tricarboxylic acids, such as phthalic acid, isophthalic acid or trimellitic acid, and bifunctional or polyfunctional alcohols, such as ethylene glycol, glycerol, pentaerythritol, trimethylolpropane and neopentyl glycol. Especially preferred are polyester resins from phthalic anhydride and pentaerythritol. Such preferred polyester resins are described for example in DE 961,575 or in the above mentioned U.S. Pat. No. 3,972,849.

Other preferred polyester resins are partially crystalline thermoplastic opaque polyester resins which have a substantial numer of amorphous regions and which contain from 35 to 95 equivalent % of crystallinity-producing monomers and from 5 to 65 equivalent % of amorphous producing monomers. Such resins and their use for the preparation of fluorescent pigments are described in EP-A 489,482, especially on page 2, line 57 through page 4, line 40 which are hereby incorporated by reference.

Other preferred polycondensation resins to be prepared and used according to the invention are polyamide resins formed by the reaction of a polyfunctional amine with both a polycarboxylic acid and a nionocarboxylic acid, said polyamide being in the molecular weight range from about 400 to about 2500. Such polyamide resins are substantially linear and have at least one carboxy group remaining on the majority of molecules, which permits a thermoplasitc resin to be formed which is extremely friable and grindable. The monocarboxylic acid may be added as such or may be formed in situ by reacting a monoamine and a dicarboxylic acid in sufficient quantity to form the desired corresponding monocarboxylic co-condensate to function as a terminator and control the molecular weight of the resin formed. Optionally, whether or not a monocarboxylic acid is added as such, or is formed in situ, a sufficient amount of stabilizing compound of an element from Groups IIA and IIB may be added to further stabilize the pigment. Such preferred polyamide resins are described in the U.S. Pat. No. 3,915,884, which document is incorporated herein by reference.

Preferred polyfunctional amines for the preparation of the instant polyamide resins are polyfunctional, preferably difunctional, primary amines. Particularly preferred are polyfunctional alicyclic primary amines, which form the most friable resins. Most preferred is isophorone diamine (1-amino-3-aminomethyl-3,5,5-trimethyl cyclohexane). Other suitable amines are aliphatic amines having an aromatic ring, such as the m- and p-xylylene diamines; aliphatic polyfunctional primary amines, such as ethylene diamine, diethylene triamine and the like.

Preferred monocarboxylic aromatic acids are benzoic acid and substituted benzoic acids, such as p-toluic, o-toluic, and 4-methoxy benzoic acid.

Preferred aromatic polycarboxylic acids are those which have carboxy groups on noncontiguous carbon atoms, such as isophthalic acid, terephthalic acid, trimesic acid and dicarboxy and tricarboxy naphthalene.

Other preferred polyamide resins are prepared by reaction of a diamine with an excess stoichiometric amount of a diacid. Such resins are described in U.S. Pat. No. 5,094,777, especially in column 2, line 13 through column 4, line 22, which are hereby incorporated by reference.

When a stabilizing compound of elements in Group IIA and Group IIB of the periodic table of elements is used, such compounds should preferably be compatible with the co-condensate and the coloring material. Suitable compounds are e.g. oxides, carbonates or organic acid salts of Group II elements, such as magnesium oxide, magnesium carbonate, zinc oxide, zinc stearate, calcium hydroxide and the like. Zinc oxide is preferred.

Other preferred polycondensation resins to be prepared and used according to the invention are epoxide resins based on bisphenol-A diglycidyl ethers and crosslinked with polyhydric phenols, such as bisphenol-A, with polycarboxylic acid anhydrides, with Lewis acids and particularly with dicyandiamides and related compounds; hybrid polyesters, such as solid saturated polyester resins having free carboxyl groups and being crosslinked with epoxide resins; polyesters, such as solid saturated polyesters having free carboxyl groups and being crosslinked with triglycidylisocyanurate (TGIC); polyurethanes, such as solid saturated polyesters with free hydroxyl groups being crosslinked with polyisocyanates.

The polycondensation resins to be used according to the instant invention may, if appropriate, also contain other stabilizing compounds, such as UV-adsorbers or light stabilizers as e.g. the hindered amine light stablizers (HALS). Such stabilizers are well known in the art.

The U.S. Pat. No. 3,915,884 and U.S. Pat. No. 5,094,777 discloses, as mentioned above, the preferred polyamides and their use for the manufacture of fluorescent pigments. However, according to that reference the resins are synthesized in a non-continuous batch process over a prolonged period of time. Such a process is characterized by all the disadvantages discussed above for similar prior art processes.

Surprisingly, with the process of the instant invention a much faster, simpler and more convenient synthesis of the above polycondensation resins and of the pigments, particularly fluorescent pigments, is provided.

The pigments according to the invention comprise preferably at least one substance which is fluorescent in daylight, the preferred concentration of said substance being between 1% and 5% by weight of the pigments. When non-fluorescent dyes, e.g. solvent dyes are used, the preferred concentration may be up to 10% by weight of the pigments.

Colorants capable of forming a solid solution in a resin and capable of fluorescing in daylight are furthermore known and are, in general, listed in the Colour Index. Rhodamines, coumarines, xanthenes, perylenes and naphthalimides will be mentioned by way of example, no limitation being implied. Examples of appropriate colorants are also compounds described in GB 1,341,602, U.S. Pat. No. 3,939,093, U.S. Pat. No. 3,812,051, DE 3,703,495 and in EP-A 422,474.

Other suitable colorants are diketo-pyrrolo-pyrroles (DPP), especially those which are soluble or at least partially soluble in the resins used. Such DPP compounds are known and are described e.g. in U.S. Pat. No. 4,415,685; U.S. Pat. No. 4,810,802; U.S. Pat. No. 4,579,949 and especially in U.S. Pat. No. 4,585,878.

Preferred DPP colorants are compounds of the formula I (I)

wherein $R_1$ and $R_2$ independently of one another are hydrogen, $C_1$–$C_{18}$alkyl, $C_1$–$C_4$alkoxy, phenyl, cyano or halogen and $R_3$ and $R_4$ independently of one another are hydrogen, $C_1$–$C_{18}$alkyl, $C_3$–$C_{12}$alkenyl, $C_3$–$C_5$alkinyl, $C_2$–$C_5$alkoxycarbonyl, carbamoyl, $C_2$–$C_{13}$-alkylC$_1$–C$_4$alkoxycarbonyl, phenyl or phenyl substituted by chlorine, bromine, $C_1$–$C_4$alkyl, $C_1$–$C_4$alkoxy, trifluoromethyl or nitro. The substituents $R_1$ and $R_2$, if any, in each of the phenyl rings are preferably in the 3-position, most preferably in the 4-position. The alkyl and alkoxy groups, respectively can be straight chain or branched, such as methyl, ethyl, n- and isopropyl, n-, sec-, teit- and isobutyl etc. $C_3$–$C_{12}$alkenyl can be e.g. allyl, methallyl, 2-butenyl, 2-hexenyl, 3-hexenyl, 2-octenyl or 2-dodecenyl and $C_3$–$C_5$alkinyl e.g. propargyl, 1-butinyl, 2-butinyl or n-1-pentinyl. Particularly preferred are compounds of formula I, wherein $R_1$ and $R_2$ are hydrogen, 4-chloro or 4-tert-butyl and wherein $R_3$ and $R_4$ are hydrogen, methyl or 4-chlorophenyl. Also preferred are solubilizing groups $R_1$ to $R_4$.

When the above DPP compounds are used as colorants, the preferred concentration of said compounds is in the range of 0.01–5%, particularly 0.1–1%, by weight of the pigments.

Surprisingly, the pigments obtained when DPP colourants are used, are characterized by an unexpectedly increased light stability, when compared to the above soluble DPP colorants as such (i.e. not incorporated in a polycondensation resin according to the invention), and even more so when compared to the pigments obtained by using the other non DPP colorants defined above.

The compositions obtained by incorporating the above DPP colorants into the preferred polycondensation resins defined above are new. Consequently, another object of the invention are compositions comprising a diketo-pyrrolo-pyrrole colorants and a polycondensation resin selected from the group of crosslinked polyester resins from aromatic polycarboxylic acids or their anhydrides, particularly aromatic dicarboxylic and tricarboxylic acids, and bifunctional or poylfunctional alcohols, such as resins from phthalic anhydride and pentaerythritol, and polyamide resins formed by the reaction of a polyfunctional amine with both a polycarboxylic acid and a monocarboxylic acid, said polyamide being in the molecular weight range from about 400 to about 2500. Preferred such polyester of polyamide resins are defined above.

The above compositions according to the invention can be prepared by mixing the reactants for the formation of said polycondensation resin and the DPP colorant in a reaction vessel and, if appropriate, heating the mixture obtained a temperature of between 100° C. and 280° C., preferably at a temperature of between 170° C. and 280° C., until the polycondensation resin is formed. The above process for the preparation is another object of the instant invention. The brittle polycondensation resin comprising the DPP colorant can then be micronised to the desired pigment particle size in any general manner known to the person skilled in the art. The viscous mixture obtained after the condensation reaction can for example be poured into a shallow pan, and after cooling down and solidifying it can be broken Lip into flake size particles and subsequently micronised.

The present invention is particularly adapted to the manufacture of daylight fluorescent pigments, that is to say pigments whose colored composition comprises one or more substances which are fluorescent in daylight and/or optionally one or more common colored substances. However, it is not limited to pigments of this type: by including in a resin according to the invention a compound which does not absorb in the visible but which fluoresces when it is excited by UV radiation, "transparent" pigments are obtained, which can be employed for particular applications such as invisible inks.

The pigments of the invention are suitable for a wide variety of applications, such as paper coating, textile printing, preparation of paints, plastisols, pastes, inks, markers, toners for non-impact printing or cosmetics.

The instant pigments are characterized by high heat stability and high light stability. Therefore they are particularly suitable for the mass coloration of polymers, particularly of those thermoplastic polymers in which the instant pigments can easily be dispersed. Suitable such polymers are e.g. polyesters, polyamides, PVC-polymers, ABS-polymers, styrenics, acrylics or polyurethanes. Particularly suitable polymers are polyolefins, especially polyethylene or polypropylene. It is particularly convenient to use the instant pigments for the preparation of fluorescent polymer, especially polyolefin masterbatches. The instant pigments, particularly those prepared with basic dyes or with solvent dyes, can also advantageously be used in printing inks, e.g. for textile printing.

The present invention also makes it possible to manufacture common, nonfluorescent colored pigments.

The concentration of the fluorescent substances in the mixture which is to be polycondensed may be adjusted so that the intensity of fluorescence is maximised. After polycondensation and micronisation the local microconcentration of fluorescent substances dissolved in the polymeric matrix remains constant whatever the subsequent overall dilution of the pigment powder, according to its use.

In the continuous process according to the present invention the polycondensation of the reaction mixture is preferably performed in a temperature range lying between 100° C. and 280° C.

When said polycondensation resin is a polyester resin, a hybrid polyester resin, a polyamide resin, an epoxide resin or a polyurethane resin, the temperature is more preferably between 170° C. and 280° C., especially preferred between 190° C. and 260° C.

When said polycondensation resin is a melamine formaldehyde resin obtained by the polycondensation of components A, B, and C described above, the reaction is preferably performed in a temperature range lying between 105° C. and 190° C.

The continuous polycondensation process is carried out in a particularly convenient and simple manner, wherein the colored composition and the reactants for the formation of the polycondensation resin are introduced continuously into a reactor, are melted and mixed, the mixture travels forward in the reactor and at the end of reaction the mixture is continuously withdrawn in a pasty state from the said reactor. The residence time of the mixture in the reactor is less than 10 min; on the average it is 1–4 minutes, particularly 2–3 minutes.

This process period which is short, when compared with the processes of the prior art (i.e. minutes vs. several hours) offers the additional advantage of making it possible to include in the resin matrix heat-sensitive colored substances and compositions (on condition that they withstand being heated to the reaction temperature for a few minutes), which would have been destroyed in the processes of the prior art.

Another advantage of the process according to the present invention is that it is possible to cast or drop the mixture at the end of reaction onto a conveying device on which it breaks up, cools and forms brittle flakes, and this makes it possible to do without a stage of crushing a solidified reaction mass. The flakes thus formed can be easily detached from the conveying device and are easy to micronise after cooling. The flakes are preferably micronised to a particle size of between 0.5 and 20 $\mu$m. The particularly preferred mean particle size is between 3 and 7 $\mu$m. An extruder has been found particularly suited as a reactor for implementing the process according to the present invention. In a particularly preferred manner use is made of an extruder whose endless screw is responsible both for mixing the components and propelling the reaction mixture in the reactor, and also for its extrusion. It is particularly advantageous to recover the reaction mixture at the outlet of the extruder on a conveyor belt which has means for cooling and means for detaching the said flakes from the said belt. The conveyor belt may be e.g. cooled by air or by water. The mixture leaving the extruder in the form of a pasty lace breaks up on the conveyor belt into droplets which spread and cool, forming flakes. At the other end of the conveyor belt these flakes are easily detached from the belt and are taken to the micronisation.

The characteristics and the advantages of the present invention will be understood better with the aid of the process diaigram (FIG. 1) and of the examples below.

EXAMPLE 1

Manufacture of Colored Mixtures

A range of shades extending from yellow to orange shades and to red can be produced by mixing e.g. the following colorants, listed in the Colour Index:
Solvent yellow 43
Solvent yellow 44 (C.I. No. 56200)
Solvent yellow 172
Basic yellow 13
Basic yellow 19
Basic yellow 45
Basic red 1 (rhodamine 6G, C.I. No. 45160)
Basic violet 10 (rhodamine B, C.I. No. 45170)
Basic blue 7 (C.I. No. 42595)
Pigment green 7 (C.I. No. 74260).

Pinks and mauves can be produced from rhodamine mixtures; in the case of mauve, the latter may be obtained e.g. by tinting basic violet 10 with basic blue (in small quantity, to minimise the fluorescence extinction). Green shades can be obtained with the aid of e.g. pigment green 7 and of yellow colorants.

A fluorescent whitening agent may be added.

EXAMPLE 2

Manufacture of Colored Melamine Formaldehyde Flakes

Figure 1:
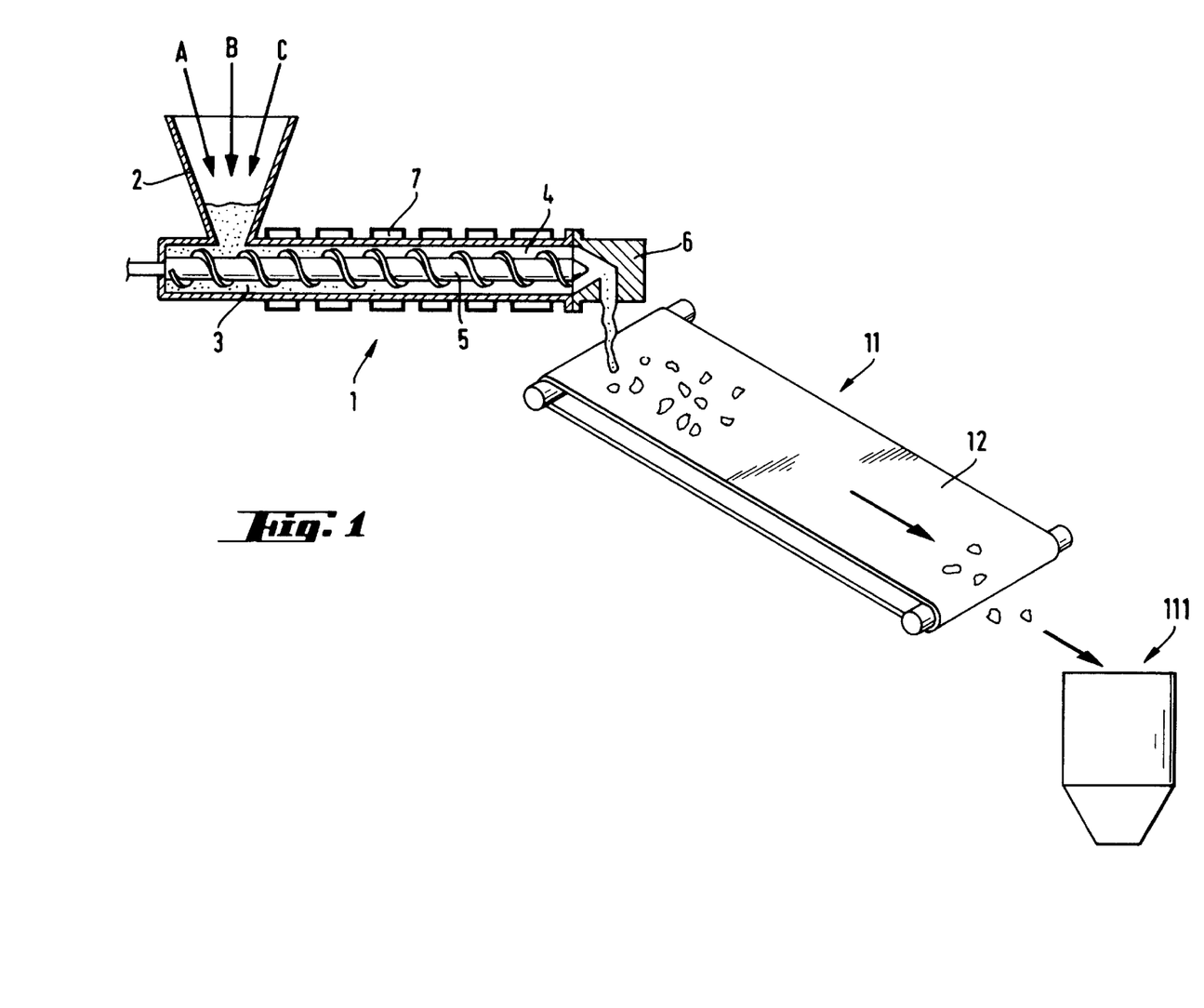
FIG. 1 is a process diagram of the process of the invention.

A mixture comprising, by weight, 57% of para-toluenesulfonamide, 25% of paraformaldehyde and 15% of melamine (filled with 3%, relative to the total mixture, of yellow 43 colorant) is introduced (overall how rate 30 kg/hour) via the feed hopper (2) of an extruder (1) of coaxial type. The internal temperature of the compression zone (3) and of the extrusion zone (4) of the extruder are maintained at 175° C. (heater elements 7). The components of the reaction mixture are mixed with the aid of an extrusion screw (5) with a cylindrical core, which propels them through the compression zone. The average residence time, from the feed hopper to the extrusion head, is 2' 30". An extrusion head (6) for solid beam profiles can be employed. The extruded pasty lace falls, breaking up, onto a conveyor (11) with a water-cooled endless belt (12). The resin forms flakes on the belt and has set when it reaches its end.

EXAMPLE 3

Flake Micronisation

The flakes recovered at the end of the belt are fed into a mill (111) of the air jet microniser type.

The operating conditions are: dry air at 7 bars, room temperature, 25 kg/hour flow rate.

The table below gives the particle sizes of the pigments obtained.

| Colorant name | Average | Standard deviation |
| --- | --- | --- |
| Fuchsia pink | 4.7 $\mu$m | 3.3 $\mu$m |
| Fire orange | 5.2 $\mu$m | 3.4 $\mu$m |
| Yellow | 5.3 $\mu$m | 4.0 $\mu$m |
| Green | 5.4 $\mu$m | 3.7 $\mu$m |

For all these samples more than 99% of the micronised material is between 0.9 and 14 $\mu$m in particle size.

EXAMPLE 4

According to the process of example 2, a fluorescent pink pigment is prepared from a mixture having 70% by weight of para-toluene sulfonamide, 18% by weight of paraformaldehyde, 9% by weight of melamine (dyed by 1.5% by weight of basic red 1 and 1.5% by weight of basic violet 10, the amount of colorant being relative to the total mixture).

By means of a latex (latex BASF SD 215®), a fluorescent pigment composition is prepared to be used for coating paper comprising:
25 parts of pink fluorescent pigment
25 parts of Carbital 95®
25 parts of latex BASF SD 215®
25 parts of of water A fluorescent pink coated paper is obtained.

EXAMPLE 5

A fluorescent pink pigment composition called master-batch (cylindrical granulate forms—length: 5 mm-diameter: 2 mm) is obtained by including 35 g of pink fluorescent pigment of example 4 in 65 g of a polyvinyle chloride mixture composed of 55% of polyvinyle chloride, 31% of dioctyl phthalate and 2% of an organo-tin stabilizer, and passing said mixture through an extruder at 125° C. The filaments obtained are cooled at room temperature and passed through a grind-mill.

EXAMPLE 6

Manufacture of Colored Polyester Resin Flakes

A mixture comprising, by weight, 68.5% of phthalic anhydride (flakes), 30.6% of pentaerythritol and 0.9% of rhodamine B is introduced (overall flow rate 30 kg/hour) via the feed hopper (2) of an extruder (1) of coaxial type. The internal temperature of the compression zone (3) and of the extrusion zone (4) of the extruder are maintained in a temperature range of 190 to 260° C. (heater elements 7). The components of the reaction mixture are mixed with the aid of an extrusion screw (5) with a cylindrical core, which propels them through the compression zone. The average residence time, from the feed hopper to the extrusion head, is 2'. An extrusion head (6) for solid beam profiles can be employed. The extruded pasty lace falls, breaking up, onto a conveyor (11) with a water-cooled endless belt (12). The resin forms flakes on the belt and solidifies while it reaches its end.

EXAMPLE 7

Flake Micronisation

The flakes recovered at the end of the belt are fed into a mill (111) of the air jet microniser type. The operating conditions are: dry air at 7 bars, room temperature, 20 kg/hour flow rate. The average particle size of the pigments obtained depends on the flow rate and ranges from 1 to 15 $\mu$m for more than 99% of the micronised material.

EXAMPLE 8

Manufacture of Colored Polyamide Flakes and their Micronisation

According to the process of examples 6 and 7, a fluorescent yellow pigment is prepared from a mixture having 35.3% by weight of isophorone diamine, 34.5% by weight of isophthalic acid, 25.3% by weight of benzoic acid, 3.3% by weight of zinc oxide and 1.6% by weight of Hostasol® Yellow 3G (Hoechst AG; solvent yellow, C.I. No. 56238).

EXAMPLE 9

Preparation of a Masterbatch

A fluorescent pink pigment composition called masterbatch (cylindrical granulate forms—length: 5 mm-diameter: 2 mm) is obtained by including 30 parts of pink fluorescent polyester pigment of example 6 and micronised as described in example 7 in 70 parts of a polyethylene mixture composed of 32 parts of low density polyethylene (Escorene® 600 BA G20; Exxon Chemicals), 32 parts of low density polyethylene (Escorene® 6201 RQ G50; Exxon Chemicals), 5 parts of polyethylene wax AC 540® Allied Chemical Co.) and 1 part of zinc stearate, and passing said mixture through an extruder at 155° C. The filaments obtained are cooled at room temperature and passed through a grind-mill.

EXAMPLE 10

Preparation of a Masterbatch

A fluorescent yellow pigment composition called masterbatch is obtained as described in example 9 above by using 30 parts of the yellow fluorescent polyamide pigment prepared in example 8 and micronised as described in example 7.

EXAMPLE 11–12

Manufacture of Colored Polyamide Flakes and their Micronisation

Example 11

According to the process of Examples 6 and 7 a fluorescent pink pigment is prepared from a mixture having 14.9% by weight of benzoic acid, 41.5% by weight of isophorone diamine, 40.5% by weight of isophthalic acid and 3.1% by weight of Flexo red 540 (BASF AG; rhodamine B, C.I. No. 45170).

EXAMPLE 12

According to the process of Examples 6 and 7 a fluorescent yellow pigment is prepared from a mixture having 10.5% by weight of benzoic acid, 43.7% by weight of isophorone diamine, 42.7% by weight of isophthalic acid and 3.1% by weight of fluorescent yellow AA 216 (Holidays, Huthersfield, GB; C.I. Basic yellow 40).

EXAMPLE 13

According to the process of example 6 fluorescent pink pigments are prepared from mixtures having the following compositions.

|  | A | B | C |
|---|---|---|---|
| Benzoic acid | 8.1% | 24.9% | 10.5 |
| Isophorone diamine | 44.9% | 34.8% | 43.7% |
| Isophthalic acid | 43.9% | 33.9% | 42.7% |
| Flexo red 540 | 3.1% | 3.1% | 3.1% |
| Zinc oxide | — | 3.3% | — |

EXAMPLE 14

Flake Micronisation

The flakes recovered at the end of the belt from sample 13B above are fed into a mill of the air jet microniser type (Alpine 200 AFG, Augsburg). The particle size of the pigments obtained as analyzed by Sympatec Helos is given below.

| Velocity (rpm) | Flow (kg/h) | $d_{50}$ | $d_{97}$ | $d_{10}$ |
|---|---|---|---|---|
| 11000 | 48 | 2.4 | 7.5 | 0.9 |
| 8500 | 72 | 2.8 | 9.3 | 0.9 |
| 7800 | 100 | 3.0 | 10.4 | 0.9 |
| 5000 | 154 | 4.2 | 23.8 | 1.0 |

EXAMPLE 15

Manufacture of Colored Poyester Resin Flakes and their Micronisation

According to the process of examples 6 and 7, but replacing the rhodamine B with 0.1% by weight of the pigment produced of a diketo-pyrrolo-pyrrole of the formula I wherein $R_1$–$R_4$ is hydrogen (prepared according to example 1 of U.S. Pat. No. 4,579,949), a fluorescent yellow-orange pigment is prepared.

EXAMPLE 16

Manufacture of Colored Polyamide Flakes and their Micronisation

According to the process of example 8, a fluorescent yellow-orange pigment is prepared from a mixture having 35.3% by weight of isophorone diamine, 34.5% by weight of isophthalic acid, 26.85% by weight of benzoic acid, 3.3% by weight of zinc oxide and 0.05% by weight of a colorant of formula I above, wherein $R_1$ and $R_2$ are 4-chloro and $R_3$ and $R_4$ are hydrogen (prepared according to example 6 of U.S. Pat. No. 4,579,949).

EXAMPLE 17

Batch Preparation of Colored Polyamide and the Micronisation Thereof

In a round bottom flask a mixture of 36% isophorone diamine, 35% of isophthalic acid, 25% of benzoic acid, 3% of zinc oxide and 1% a colorant of formula I above, wherein $R_1$ and $R_2$ are hydrogen and $R_3$ and $R_4$ are methyl (prepared according to example 1 of U.S. Pat. No. 4,585,878) is heated to 250° C., held at this temperature for 10 minutes, cooled to room temperature and micronised according to example 3 to form a orange-yellow fluorescent pigment.

EXAMPLE 18

Manufacture of Colored Polyamide Flakes and their Micronisation

A fluorescent orange-yellow pigment is prepared as described in example 8 but using a compound of formula I, wherein $R_1$ and $R_2$ are 4-tert-butyl and $R_3$ and $R_4$ are hydrogen as colorant (prepared according to example 20 of U.S. Pat. No. 4,579,949), instead of the Hostasol® Yellow 3G.

EXAMPLE 19

Manufacture of Colored Polyamide Flakes and their Micronisation

A fluorescent yellow pigment is prepared as described in example 8 but using a compound of formula I, wherein $R_1$ and $R_2$ are 4-chloro and $R_3$ and $R_4$ are 4-chlorophenyl as colorant (prepared according to example 10 of U.S. Pat. No. 4,579,949).

EXAMPLE 20–23

Manufacture of Colored Polyester Flakes and their Micronisation

Examples 16–19 are repeated by using the mixture of phthalic anhydride and pentaerythritol described in example 6 as reactants for the preparation of the polycondensation resin.

EXAMPLE 24

According to the process of examples 6 and 7 a fluorescent pink pigment is prepared from a mixture having 29.2% by weight of glyderol, 69.8% by weight of phthalic anhydride flakes and 1.0% by weight of rhodamine B.

EXAMPLE 25

Example 24 is repeated by substituting phthalic anhydride by an equivalent amount of butanedioic acid.

EXAMPLE 26

According to the process of examples 6 and 7 a fluorescent pink pigment is prepared from a mixture having 29.2% by weight of ethylene glycol, 69.8% by weight of phthalic anhydride and 1% by weight of rhodamine B.

EXAMPLE 27

According to the process of examples 7 and 8 a blue pigment is prepared from a mixture having 14.9% by weight of benzoic acid, 41.5% by weight of isophorone diamine, 40.5% by weight of isophthalic acid and 3.1% by weight of Fliso Blue 630® (BASF AG).

EXAMPLE 28

A blue pigment composition for coating paper is prepared from the following components:
25 parts of blue pigment prepared in example 27
25 parts of carbital 95
25 parts of latex BASF SD 215®
25 parts of water
The composition can be used for coating paper.

EXAMPLE 29

Preparation of a Printing Ink

A fluorescent pink ink is prepared from a mixture having 100 parts of binder (Ecocryl® 0254, W. SIPPO Co., Villers Saint Paul, France), 20 parts of a fixer (fixer 99HD®, W. SIPPO Co.), 10 parts of emulsifier (ATEPRINT E9183®, Dr. Th. BHOME, Germany), 820 parts of water and 20 parts of the pink pigment obtained in example 9. The fluorescent ink is used for application by the screen process (or any similar process) on cotton fabric, which is then heated (dry heat) for 3 minutes at 150° C.

EXAMPLE 30

Manufacture of Colored Polyamide Flakes and their Micronisation

According to the process of examples 6 and 7 a fluorescent pink pigment is prepared from a mixture of 44% by weight of isophorone diamine, 27% by weight of isophthalic acid, 25% by weight of azelaic acid, 3% by weight of ZnO and 1% by weight of rhodamine B.

EXAMPLE 31

Manufacture of Colored Polyamide Flakes and their Micronisation

According to the process of examples 6 and 7 a fluorescent orange pigment is prepared from a mixture of 22% by weight of isophorone diamine, 20% by weight of 2-methylpentamethylenediamine, 29% by weight of isophthalic acid, 25% by weight of azelaic acid, 3% by weight of ZnO and 1% by weight of rhodamine 6G.

EXAMPLE 32

Manufacture of Colored Polyester Flakes and their Micronisation

According to the process of examples 6 and 7 a fluorescent yellow pigment is prepared from a mixture of 60% by weight of phthalic anhydride, 31%, by weight of 1,4-cyclohexanedimethanol, 3% by weight of ethylene glycol, 4% by weight of glycerol and 2% by weight Hostasol® Yellow 3G (Hoechst AG).

EXAMPLE 33

Batch Preparation of Colored Polyamide Flakes and Micronisation Thereof

According to the process of example 17 a fluorescent orange-yellow pigment is prepared from a mixture of 45% by weight isophorone diamine, 28% by weight of isophthalic acid, 25% by weight of azelaic acid and 2% by weight of the colorant in example 17, by heating the mixture to 270° C. for 5 minutes.

EXAMPLE 34

Batch Preparation of Colored Polyester Flakes and Micronisation Thereof

According to the process of example 17 the following mixture is heated to 280° C. for 15 minutes: 57% by weight of terephthalic acid, 12% by weight of ethylene glycol, 30% by weight of 1,4-cyclohexanedimethanol and 1% by weight of the colorant used in example 19 to produce a fluorescent yellow pigment.

EXAMPLE 35

Batch Preparation of Colored Polyester Flakes and Micronisation Thereof

According to the process of example 17 the following mixture is heated to 280° C. for 5 minutes: 29.8% by weight of terephthalic acid, 20% by weight of isophthalic acid, 50% by weight of 1,4-cyclohexanedimethanol and 0.2% by weight of the colorant used in example 18 to produce a fluorescent orange-yellow pigment.

The above examples are given merely by way of illustration. Other devices and operating conditions can be employed by a person skilled in the art without departing from the continuous polymerisation process forming the subject of the present invention.

What is claimed is:

1. A process for the manufacture of a pigment, said pigment comprising a colored composition incorporated in a polycondensation resin by continuous bulk polycondensation of a reaction mixture, said process comprising continuously introducing the reactants for the formation of said polycondensation resin and the colored composition into an extruder, causing the mixture to react and to travel forward in the extruder, continuously withdrawing, at the end of the reaction, the mixture from the extruder, depositing the mixture continuously onto a conveyor belt, breaking the mixture up into thermoset flakes and cooling the thermoset flakes, the said conveyor belt having means for cooling and detaching the said thermoset flakes from said conveyor belt and, following cooing, micronizing said flakes to a particle size of between 0.5 and 20 μm.

2. A process according to claim 1, wherein the reaction mixture is at a temperature of between 100° C. and 280° C.

3. A process according to claim 1, wherein the said coloured composition comprises at least one substance which is fluorescent in daylight and the concentration of the said fluorescent substance is between 1% and 5% by weight of the pigments.

4. A process according to claim 1, wherein the said coloured composition comprises a substance which is fluorescent when it is excited by UV radiation, but which does not absorb in the visible spectrum.

5. A process according to claim 1, wherein the said flakes are micronised to a mean particle size of between 3 and 7 μm.

6. A process according to claim 1, wherein the said extruder has at least one endless screw capable of propelling a pasty mixture.

7. A process according to claim 1, wherein the reactants for the formation of said polycondensation resin are
   (a) at least one component A which is an aromatic sulfonamide containing 2 hydrogens bonded to the nitrogen of the sulfonamide group,
   (b) at least one component B which is a substance containing 2 or more NH$_2$ groups, each of the said NH$_2$ groups being bonded to a carbon, the said carbon being bonded by a double bond to an =O, =S or =N, and
   (c) at least one aldehyde component C.

8. A process according to claim 7, wherein the concentration of the component B is between 13% and 40% by weight of the component A and the concentration of component C is between 27% and 40% by weight of the component A.

9. A process according to claim 7, wherein the reaction mixture is at a temperature of between 100° C. and 280° C.

10. A process according to claim 9, wherein the temperature is maintained between 105° C. and 190° C.

11. A process according to claim 1, wherein said polycondensation resin is a polyester resin, a hybrid polyester resin, a polyamide resin, an epoxide resin or a polyurethane resin.

12. A process according to claim 11, wherein said polyester resin is a crosslinked polyester resin from aromatic polycarboxylic acids or their anhydrides and bifunctional or polyfunctional alcohols or wherein said polyester resin is a substantially crystalline thermoplastic opaque polyester resin prepared by reacting mixtures of linear monomers with branched or substituted monomers.

13. A process acording to claim 11, wherein said polyamide resin is formed by the reaction of a polyfunctional amine with both a polycarboxylic acid and a monocarboxylic acid, said polyamide being in the molecular weight range from about 400 to about 2500 or wherein said polyamide resin is formed by reacting a diamine with an excess stoichiometric amount of a diacid.

14. A process acording to claim 11, wherein the reaction mixture is at a temperature of between 100° C. and 280° C.

15. A process acording to claim 14, wherein the temperature is maintained between 190° C. and 260° C.

16. A composition comprising a diketo-pyrrolo-pyrrole colorant and a polycondensation resin selected from the group consisting of crosslinked polyester resins from aromatic polycarboxylic acids or their anhydrides and bifunctional or polyfunctional alcohols, polyester resins, which are substantially crystalline thermoplastic opaque polyester resins prepared by reacting mixtures of linear monomers with branched or substituted monomers, polyamide resins formed by the reaction of a polyfunctional amine with both a polycarboxylic acid and a monocarboxylic acid, said polyamide being in the molecular weight range from about 400 to about 2500 and polyamide resins which are formed by reacting a diamine with an excess stoichiometric amount of diacid, said composition being in the form of thermoset flakes micronised to a particle size of between 0.5 and 20 μm.

17. A composition according to claim 16, wherein the diketo-pyrrolo-pyrrole colorants are compounds of the formula I (I)

wherein $R_1$ and $R_2$ independently of one another are hydrogen, $C_1$–$C_{18}$alkyl, $C_1$–$C_4$alkoxy, phenyl, cyano or halogen and $R_3$ and $R_4$ independently of one another are hydrogen, $C_1$–$C_{18}$alkyl, $C_3$–$C_{12}$alkenyl, $C_3$–$C_5$alkinyl, $C_2$–$C_5$alkoxycarbonyl, carbamoyl, $C_2$–$C_{13}$alkylC$_1$–$C_4$alkoxycarbonyl, phenyl or phenyl substituted by chlorine, bromine, $C_1$–$C_4$alkyl, $C_1$–$C_4$alkoxy, trifluoromethyl or nitro.

18. A mass-colored plastics material, paper sheet or textile which contains or is coated with a pigment prepared according to the process of claim 1.

19. A printing ink, paint or lacquer or a paste or plastisol which contains a pigment prepared according to the process of claim 1.

20. A mass-colored plastics material, paper sheet or textile which contains or is coated with a pigment prepared from the composition of claim 16.

21. A printing ink, paint or lacquer or a paste or plastisol which contains a pigment prepared from the composition of claim 16.

22. A composition comprising a diketo-pyrrolo-pyrrole colorant and a polycondensation resin selected from the group consisting of crosslinked polyester resins from aromatic polycarboxylic acids or their anhydrides and bifunctional or polyfunctional alcohols, polyester resins, which are substantially crystalline thermoplastic opaque polyester resins prepared by reacting mixtures of linear monomers with branched or substituted monomers, polyamide resins formed by the reaction of a polyfunctional amine with both a polycarboxylic acid and a monocarboxylic acid, said polyamide being in the molecular weight range from about 400 to about 2500 and polyamide resins which are formed by reacting a diamine with an excess stoichiometric amount of diacid, said composition being prepared according to the process of claim 1.

* * * * *